US009995586B2

(12) United States Patent
Geelen

(10) Patent No.: US 9,995,586 B2
(45) Date of Patent: *Jun. 12, 2018

(54) METHOD AND APPARATUS FOR IDENTIFYING GEOGRAPHIC LOCATIONS

(71) Applicant: Stichting Mapcode Foundation, Amsterdam (NL)

(72) Inventor: Pieter Andreas Geelen, Amsterdam (NL)

(73) Assignee: STICHTING MAPCODE FOUNDATION, Amsterdam (NL)

(*) Notice: Subject to any disclaimer, the term of this patent is extended or adjusted under 35 U.S.C. 154(b) by 26 days.

This patent is subject to a terminal disclaimer.

(21) Appl. No.: 15/183,862

(22) Filed: Jun. 16, 2016

(65) Prior Publication Data

US 2016/0363453 A1 Dec. 15, 2016

Related U.S. Application Data

(63) Continuation of application No. 14/352,691, filed as application No. PCT/EP2012/070703 on Oct. 18, 2012, now Pat. No. 9,377,311.

(30) Foreign Application Priority Data

Oct. 18, 2011 (GB) .................................. 1117901.7

(51) Int. Cl.
*G01C 21/20* (2006.01)
*G06F 17/30* (2006.01)
*G01C 21/32* (2006.01)
*C09B 29/15* (2006.01)

(52) U.S. Cl.
CPC ............ *G01C 21/32* (2013.01); *C09B 29/106* (2013.01); *G01C 21/20* (2013.01); *G06F 17/30241* (2013.01)

(58) Field of Classification Search
CPC ......... G01C 21/20; G01C 21/32; G06F 17/00; G06F 17/30; G09B 29/106; G09B 29/10
USPC .......................................................... 701/533
See application file for complete search history.

(56) References Cited

U.S. PATENT DOCUMENTS

| 4,972,319 A * | 11/1990 | Delorme ................. G06T 17/05 340/990 |
| 7,532,979 B2 | 5/2009 | Fuchs |
| 2006/0161346 A1 * | 7/2006 | Murakami ........... G09B 29/102 708/442 |

(Continued)

FOREIGN PATENT DOCUMENTS

| EP | 0871010 B1 | 11/2005 |
| RU | 2406158 C2 | 12/2010 |
| WO | 2009156427 A1 | 12/2009 |

*Primary Examiner* — Tan Q Nguyen

(57) ABSTRACT

Embodiments of the present invention provide a computer-implemented method for assigning identifiers to geographic locations within digital map data, comprising selecting a region within the map data, dividing the region into a first plurality of cells each uniquely addressable by an identifier of a first length, selecting a portion of the region and dividing the portion into a second plurality of cells each uniquely addressable by an identifier of a second length, wherein the second length is shorter length than the first length and a geographic location within the portion of the region may be uniquely identified by an identifier of the first length and an identifier of the second length.

20 Claims, 7 Drawing Sheets

(56) References Cited

U.S. PATENT DOCUMENTS

2007/0049260 A1* 3/2007 Yuhara .................. H04L 67/18
455/414.3

* cited by examiner

METHOD AND APPARATUS FOR IDENTIFYING GEOGRAPHIC LOCATIONS

FIELD OF THE INVENTION

Embodiments of the present invention relate to methods and apparatus for generating identifiers for geographic locations. In particular, embodiments of the invention relate to methods and apparatus for generating identifiers for geographic locations which are optimised for human use, so that locations with, for example, higher population density have, on average, shorter identifiers.

BACKGROUND OF THE INVENTION

In many countries locations are uniquely identified with reference to an address which often comprises a street or road name, number and city. For some countries, such as India, there is no centralised address system, or at least any such system is severely limited. It is therefore difficult for a user to input a location identifier, e.g. representative of a desired destination, into a navigation device, and other location identification techniques must be used.

A widely used system to identify geographic locations is WGS84 which specifies a longitude and latitude for every location on the earth's surface. For example WGS84 coordinates which identify TomTom Headquarters at Oosterdoksstraat 114, Amsterdam, The Netherlands is N52.376513, E 4.908496. However it can be appreciated that WGS84 coordinates are difficult for a user to remember and slow to enter into a navigation device.

It is also known to use alphanumeric codes to identify locations. One alphanumeric code system is Loc8 codes—www.myloc8ion.com—and which are described in WO 2011/073965 A1. This system uses an eight digit alphanumeric code such as W8L-82-4YK to identify a location to within a 120 m square.

A further alphanumeric based system has been developed by Denso Corporation, and which is described in U.S. Pat. No. 6,006,160, in which a region is divided into square sections of 900" (274 m), each of which is further divided into square blocks of 30" (9 m), each of which is divided into units of a square of 1" (0.12 m). Each section is defined with a section code of three figures, each block is defined with a block code of three figures and each unit is defined with a unit code of three figures so that each unit can be completely differentiated with an intrinsic code of nine figures formed by "section code", "block code", "unit code" concatenated together. It is also envisaged by U.S. Pat. No. 6,006,160 that section codes may be selectively allocated such that, for example, Tokyo may have a section code of 000 and Osaka may have a section code of 001. In this way, when leading 0's are omitted one intrinsic code (section 000 for Tokyo) can be represented as six digits, whilst some other section codes can be represented as seven digits (e.g. section 001 for Osaka). However it will be appreciated that the number of shorter section codes is limited and only one section code can benefit from having three leading 0's, i.e. being 000.

It is an object of embodiments of the invention to at least mitigate one or more of the problems of the prior art.

SUMMARY OF THE INVENTION

In accordance with a first aspect of the invention, there is provided a computer-implemented method for assigning identifiers to geographic locations within digital map data, comprising: selecting a region within the map data; dividing the region into a first plurality of cells each uniquely addressable by an identifier of a first length; selecting a portion of the region; and dividing the portion into a second plurality of cells each uniquely addressable by an identifier of a second length, wherein the second length is shorter length than the first length and a geographic location within the portion of the region may be uniquely identified by an identifier of the first length and an identifier of the second length.

The portion of the region may be selected based on one or more attributes of the map data. One or both of the region and the portion of the region may be selected based upon one or more criteria and the attributes of the map data. The criteria may be indicative of a population density associated with the digital map data. The region may correspond to a region demarcated in the map data. The method may further comprise selecting one or more further portions of the region, and dividing the one or more further portions into further pluralities of cells each uniquely addressable by an identifier of successively short length. A geographic location in each further portion of the region may be identifiable by a plurality of identifiers or different lengths. The region and the one or more portions may be divided into substantially equally sized cells. The identifier may comprise prefix and postfix portions divided by a separator. The identifier may be formed from alphanumeric characters.

The invention further encompasses an apparatus, such as a computing device comprising one or more processors, arranged to perform any or all of the required and optional steps of the above described method. The present invention further extends to a, preferably non-transitory, computer program product comprising computer readable instructions executable to perform a method according to any of the aspects or embodiments of the invention.

In accordance with a further aspect of the invention, there is provided a context table for identifying geographic locations, comprising: a context identifier associated with a geographic region; information identifying a location of a firstly plurality of cells dividing at least a part of the geographic region, each cell being associated with a unique identifier of a first length; and information identifying a location of a second plurality of cells dividing one portions of the geographic region, each cell being associated with a unique identifier of a second length, wherein geographic locations within the second plurality of cells are uniquely identified by identifiers of the first and second lengths.

The context table may further comprise one or more further pluralities of cells dividing portions of the geographic region, each cell in each respective plurality of cells being associated with a unique identifier of successively decreasing length. The first and second pluralities of cells may be associated with the context identifier. The second plurality of cells may be associated with one or more further context identifiers. The context table may further comprise size information indicating a size of each cell in the first and second plurality of cells. The context table may be generated as a result of the above described methods. The context table may be stored on a computer readable medium.

In accordance with another aspect of the invention, there is provided a navigation device, comprising: a display screen for providing navigation information to a user; and a processor communicably coupled to a data store comprising a context table (e.g. as described above), wherein the processor is arranged to receive, from a user, at least one identifier, and to determine at least one geographic location corresponding to the respective identifier from the context table.

The at least one identifier received from the user may be representative of a desired destination, and the processor is arranged to determine a route to the geographic location identified by the received identifier. The processor may be arranged to receive a context identifier from the user, wherein the context identifier is indicative of a geographic region, and wherein the processor is arranged to determine the at least one geographic location using the context table based on the received context identifier.

It will be appreciated that any of the further aspects of the invention may include any or all of the features of the invention described in relation to any other aspects and embodiments of the invention to the extent they are not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described by way of example only, with reference to the accompanying figures, in which.

DETAILED DESCRIPTION OF PREFERRED EMBODIMENTS

Figure 1:
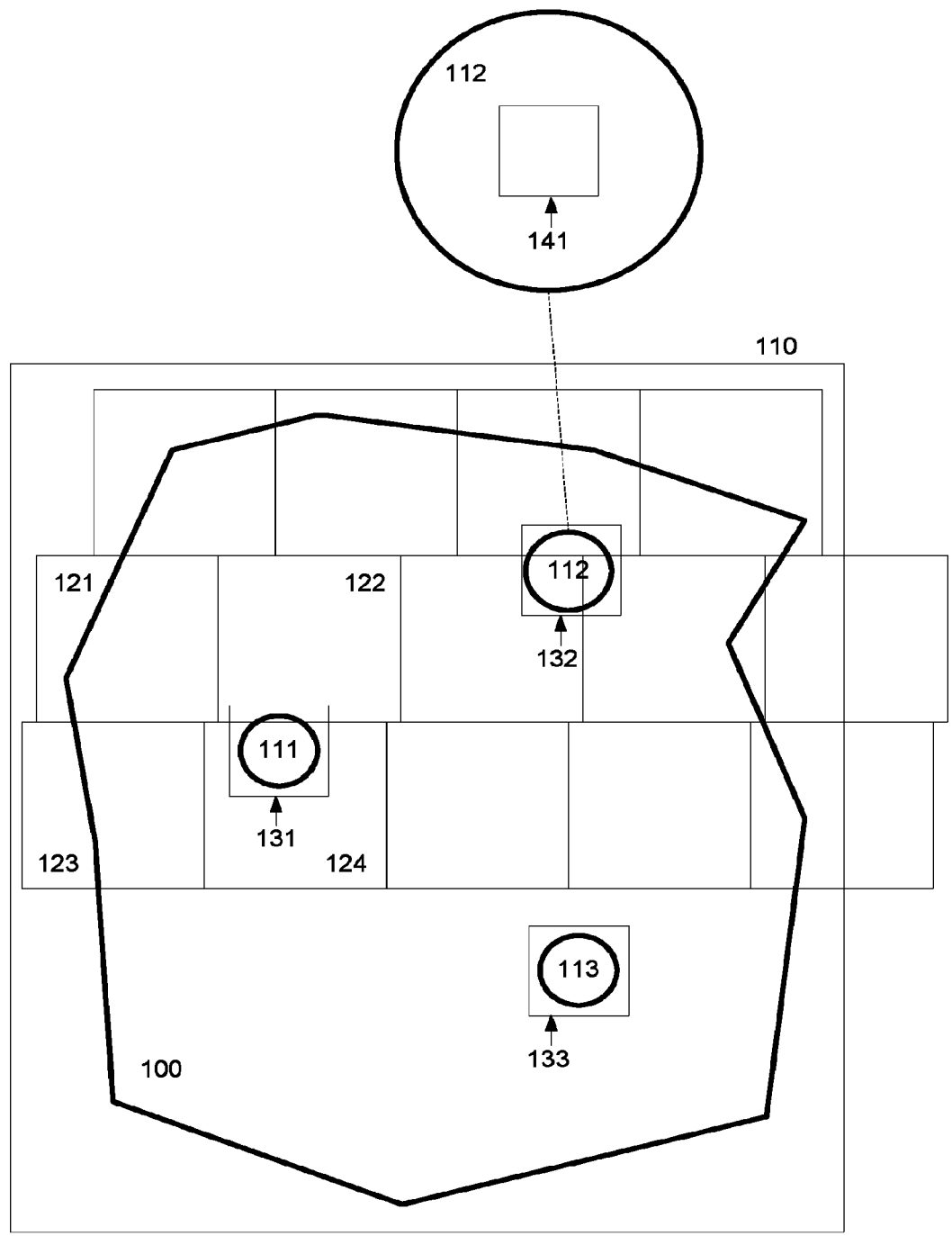
FIG. 1 illustrates an association of identifiers with a map according to an embodiment of the invention.

Embodiments of the invention provide a system for uniquely identifying a geographic location to within a predetermined precision using an identifier having a length which is on average as short as possible. That is, embodiments of the invention facilitate using identifiers for geographic locations which are shorter for most frequently identified locations, as will be explained.

Embodiments of the invention provide a method and apparatus for identifying a geographic location wherein a first portion of a map, such as a country, state, etc, is divided into a first plurality of cells each addressable by a first unique identifier having a first length. A second portion of the map is selected and divided into a second plurality of cells each addressable by a second unique identifier, wherein the second unique identifier has a shorter length, i.e. comprises fewer characters than the first unique identifier. A location within the first and second map portions covered by the first and second plurality of cells is capable of being identified using both of the first and second identifiers, although as will be appreciated only one of the identifiers will typically be used in practice. The second identifier is typically more convenient in use due to its shorter length, but there may be circumstances in which it may be desirable to use the longer first identifier.

In some embodiments the second portion is selected based on one or more attributes associated with one or more regions of the map, such as the shape of a landmass or defined borders between countries, regions and the like. By suitable selection of such attributes, optionally in association with other criteria, such as population density, the frequency of use of the second identifier can be arranged to be greater than the first identifier. As will be explained in more detail below, the frequency of use of the second identifier may be greater, even though the second portion of the map is smaller than the first portion of the map.

Embodiments of the invention provide identifiers for geographic locations having a predetermined number of characters. In most embodiments, the characters are alphanumeric characters. However, in some embodiments, the alphanumeric characters may be selected from a limited set, such as a set including only letters and numbers, the set of only letters and numbers with 1, 0 (zero), I and O removed in order to avoid accidental confusion, or the set of only letters and numbers with vowels removed. The set of alphanumeric characters having 1, 0 (zero), I and O removed provide a set of 34 values, whilst the set having vowels removes provides a set of 31 characters. It is also envisaged that other sets of alphanumeric characters may be used, such as those including fewer characters or those also including one or more other characters or symbols. In some embodiments the identifier is case insensitive. For consistency identifiers described herein will be shown in capitals, although lower case or a mixture may be used. Embodiments of the invention will be explained with reference to the set of 31 characters mentioned above, although it will be realised that this is exemplary.

In embodiments of the invention an identifier for a geographic location comprises a predetermined number of characters divided into prefix and postfix portions by a predetermined divider or separator. The identifier may be divided into equally or unequally sized portions, as will be shown. In some embodiments, the prefix and postfix portions at most differ in length by a predetermined number of characters, such as one character.

Identifiers according to embodiments of the invention are used to uniquely identify a geographic area of a predetermined size, known as a cell. The cell may be square, although rectangular cells may be used in some embodiments. In some embodiments of the invention the cell has a size of 10 m×10 m, although it will be realized that other size cells may be used, such as 20 m×20 m or other sizes.

Given an identifier of character length n with the cell size (or area) of a the respective geographic area A that may be uniquely identified using a set of c characters is calculated by:

$$A = c^n a$$

Thus, for example, based on the use of 31 characters and a cell size of 100 m², the following geographic areas for different numbers of characters is shown in the table below.

| Characters | Area (km²) |
| --- | --- |
| 4 | 92.4 |
| 5 | 2,862.9 |
| 6 | 88,750.4 |
| 8 | 2,751,261.4 |
| 9 | 2,643,962,216.1 |

In order to make identifiers more easily human distinguishable and conveyable, embodiments of the invention will be described which identifiers are divided by a dot ".", although it will be realized that identifiers may be divided by other symbols, such as a semicolon ";".

Thus a four character identifier according to an embodiment of the invention may be US.SK; a five character identifier as AB.CDE; a six character identifier as FGH.IJK, and so on. In some embodiments the prefix is a minimum of two characters in length. As noted above, in embodiments of the invention, for a geographic area at least some portions of the area are uniquely identifiable by two or more unique identifiers or different lengths.

FIG. 1 illustrates identifiers associated with a map according to an embodiment of the invention. A country 100 is schematically illustrated. Whilst a country is referred to with reference to FIG. 1 it will be realised that the area of land indicated as 100 could be a state, region, such as the European Union, or otherwise demarcated area of land. The exemplary country 100 comprises three areas of significant population, such as cities 111, 112, 113.

It may be desired to be able to identify locations across an entirety of the country 100. Therefore the entire area of the country 100 may be compared against the table above, or other equivalent table for the respective number of characters used, to determine the number of characters necessary to form an identifier to identify locations throughout the country 100 with a respective cell size. For example, the Netherlands covers an area of approximately 42,000 km². Therefore it is necessary to use a six character identifier for the country 100.

Identifiers for the country 100 may be assigned to a single unitary area covering the entire country, such as rectangular area 110 which is sized and located to cover the entire country 100. However, depending on the shape of the area to be covered, it may be more efficient to assign identifiers across a plurality of smaller areas having a combined maximum area of up to the limit for the chosen number of characters forming the identifier. For example, six figure identifiers may be assigned amongst areas 121, 122, 123, 124 and other corresponding areas shown in FIG. 1 but not specifically indicated with reference numerals. These areas 121, 122, 123, 124 are each smaller than the area of the country 100 and may be arranged to tessellate to cover the entire country 110. However in other embodiments, as will be explained, it may not be necessary to cover the entire country and areas 121, 122, 123, 124 may be located to substantially cover the country 100 according to one or more predetermined criteria. Six figure identifiers are then assigned to cells arranged within the areas 121, 122, 123, 124. The area 110 or areas 121, 122, 123, 124 are associated with a context identifier for the area of land, i.e. the country 100. The context identifier may be an ISO defined identifier, for example an ISO 3166 country code, although it will be realised that other identifiers may be used, such as another letter or plurality of letters, or one or more numbers selected to identify the country in a context table, as will be explained.

It is likely that it will be required to identify some areas of the country 100 more frequently than others. For example, it is more likely that it is required to identify locations of homes, businesses, etc than rural or relatively unpopulated areas. Therefore, some regions or portions of the country 100 are also associated with identifiers of a shorter length than those utilised for area 110 or areas 121, 122, 123, 124. In this example, a five character identifier may be used with a cell size of 100 m² to identify locations in one or more area(s) up to 2,862.9 km². Therefore one or more portions of the country are selected to also be identified by a five character identifier. A method of selecting the portions is explained below. In an exemplary embodiment of the invention the portions are selected according to population density. Thus the most populated areas of the country are covered by one or more areas in which locations are associated with shorter identifiers, such as a five character identifier, although it will be appreciated that the number of characters is merely illustrative.

FIG. 1 shows three areas 131, 132, 133 in which locations are identified by five character identifiers. The locations of these three areas are selected to correspond to the most highly populated regions in the country, i.e. cities 111, 112, 113. Whilst three areas are shown it will be realised that there may be n regions, where n is 1 or more having a total (combined) area of up to 2,862.9 km². For example, each of the areas 131, 132, 133 may have a predetermined size of 100 km² and located to correspond to the most highly populated areas within country 100. Thus up to 28 areas may be allocated to cover the most highly populated areas within country 100.

Still further, one or more areas having a yet shorter identifier may be located overlying country 100 to correspond to the most densely populated regions within the country 100. FIG. 1 contains an enlarged view of city 113 wherein a portion of the city is covered by an area 141 in which locations are identified using a four character identifier.

In the above example, locations within each area forming a hierarchy of areas 121, 131, 141 are identified using identifiers having a progressively shorter length to the same accuracy, i.e. all associated with a cell of the same size, such as 10 m×10 m. However it will be realised that identifiers of each respective length may identify locations to a different degree of accuracy, i.e. each length identifier may be associated with cells of a different size. For example the six character identifier may be associated with a cell size of 50 m×50 m, the five character identifiers may be associated with a cell size of 20 m×20 m and the four character identifiers may be associated with a cell size of 10 m×10 m. In these embodiments a greater precision of location identification can be achieved with shorter identifiers. Furthermore, shorter identifiers are also more easily to remember and convey between persons, either in writing or aurally.

Figure 2:
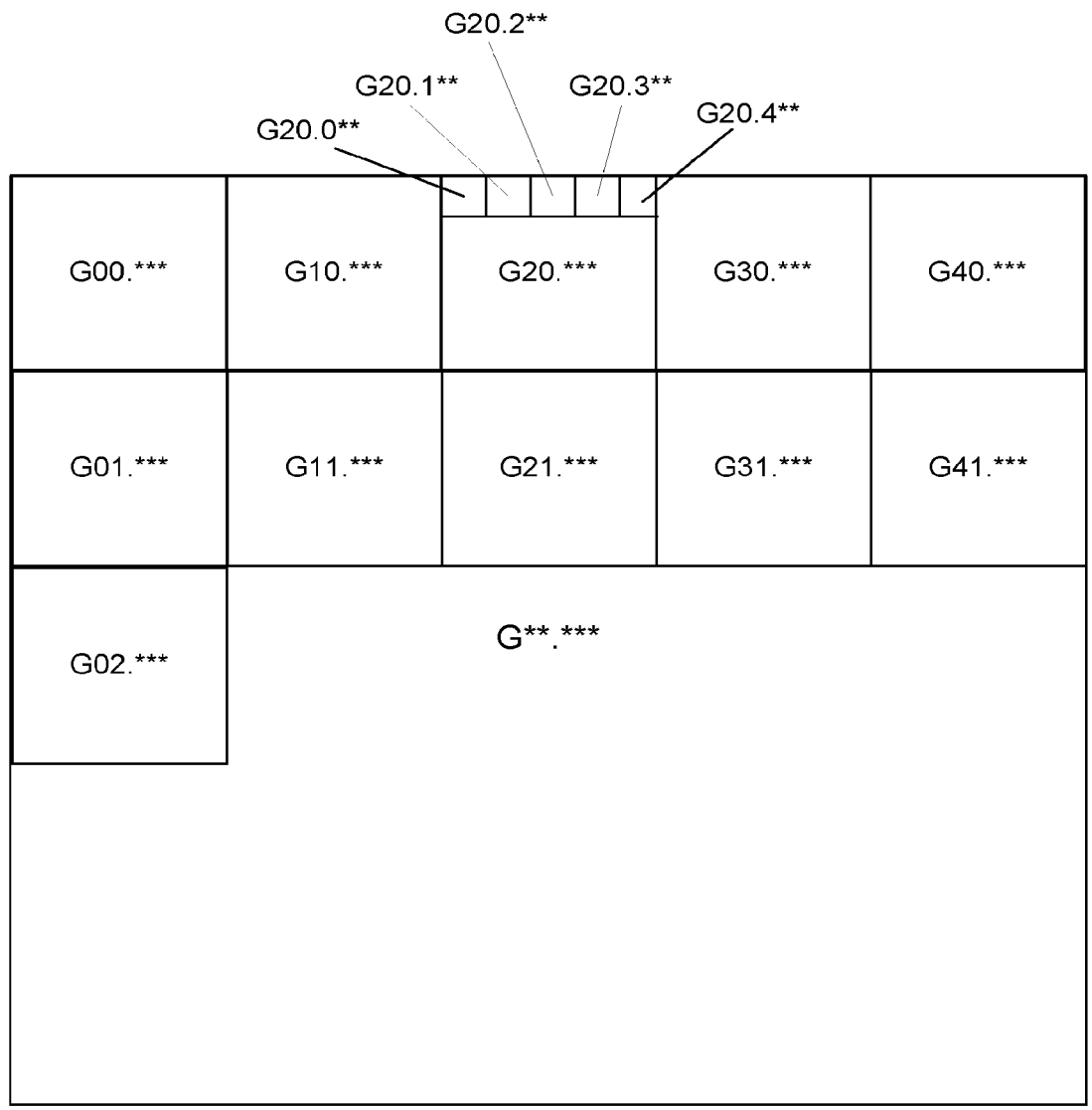
FIG. 2 shows an arrangement of identifiers according to an embodiment of the invention.

FIG. 2 illustrates a property of the identifiers which enables easier recognition of locations and usage. FIG. 2 illustrates an arrangement of a six character identifier. A first region is identified by a selected first character of the identifier, such as character G.* where * is a wildcard character. A second smaller region within the first region is identified by the inclusion of a first, next least significant, character of the identifier, such as G0*.*. Similarly by the inclusion of a further character, such as G02.3, a still smaller area can be located. Thus for persons using the identifiers according to embodiments of the invention an area may be referred to at lower precision using only some of the characters forming the identifier, such as the "G20.2" area which is only part of the six character identifier.

It will be appreciated that for some locations within country 100, such as a location within the area 141, i.e. within city 113, locations may be identified by, not only the four character identifier defined within the area 141, but also by the five character identifier defined by area 132, and also by six character identifier associated with the one or more surrounding areas. In embodiments where all length identifiers use the same size cells, the precision of using all length identifiers is the same.

A method 300 of assigning identifiers to geographic locations will now be described with reference to FIG. 3.

Figure 3:
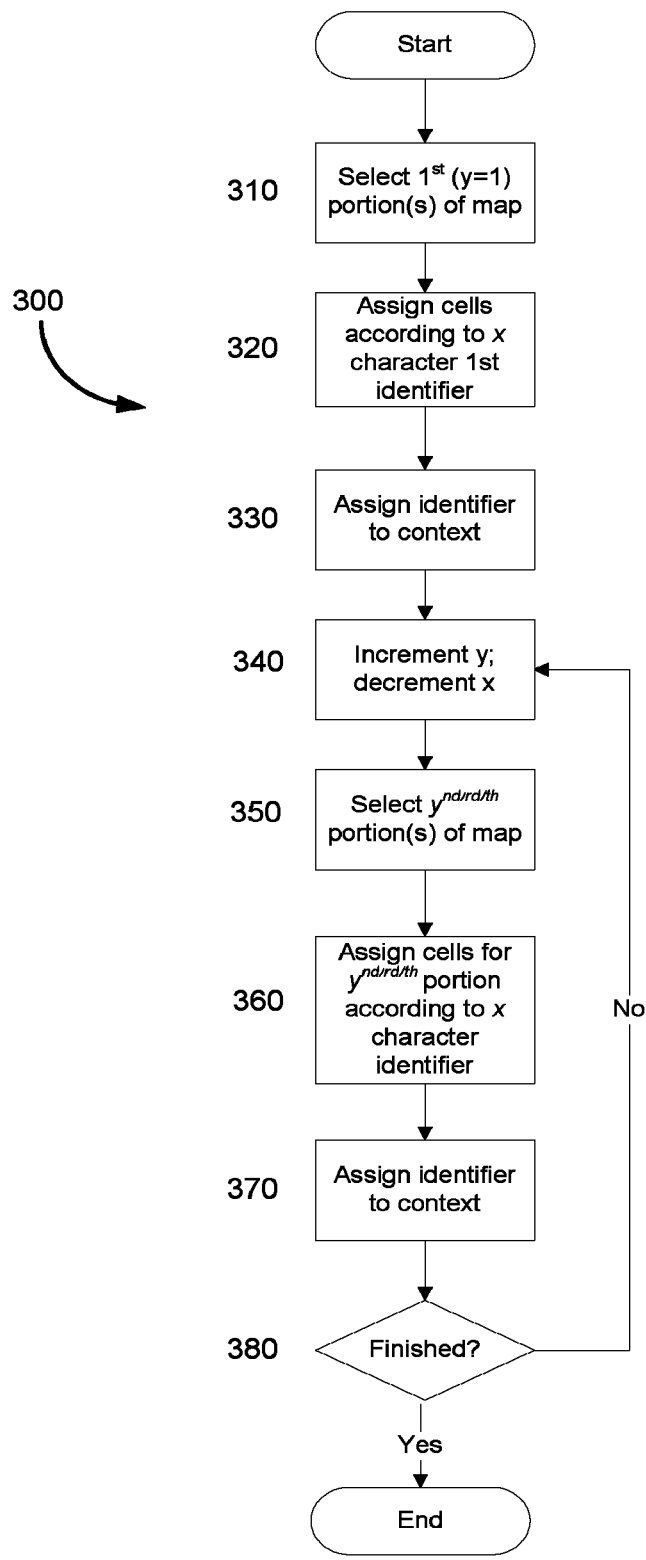
FIG. 3 shows a method according to an embodiment of the invention.

Two variables are used in the method 300 shown in FIG. 3. A first variable y is used to track portion(s) of the map being selected. The first variable is initialised to y=1 at the start of the method 300. A second variable x is used to track a length of the identifier for the y$^{th}$ area. In the embodiment described x is initialised to 6, this being the number of characters chosen or necessary to identify locations in the y$^{th}$ area, although it will be realised that other initialisation values may be used. A cell size may also be selected prior to the method beginning, or a predetermined cell size may be selected prior to the method, such as the cell size of 10 m×10 m referred to above. The variable x may only be initialised in step 310 once the first portion of the map has been selected. In this way, the length x in characters of the first identifier may be selected to uniquely identify locations throughout the area of the first map portion, given the cell size.

The method starts with a map of a geographic area. The map may be stored as digital map data in a memory or other storage device of a computing device; the digital map data typically being a digital representation of the geographic area. The method 300 may be performed by a processor of the computing device operating according to a computer program arranged, when executed by the processor, to perform the method 300. The computer program may be tangibly stored on a computer readable medium. The map may be for the entire world, or a smaller portion thereof such as a region, i.e. a continent, a country or a state. Other portions are also envisaged.

In step 310 one or more first (y=1) portions of the map are selected. The map may represent an entire country, although the map may also relate to part of a country, such as a state, e.g. a US state. For explanation it will be assumed that the map relates to the country 100 shown in FIG. 1. The first portion of the map may be selected by defining a rectangle around the entire territory or country 100, in which case the first portion is a unitary area such as area 110 shown in FIG. 1. However in other embodiments the one or more portions of the map may be selected according to one or more predetermined criteria. The one or more criteria may be chosen such that the selected portions have the highest likelihood of usage. In one embodiment, the portions are selected according to population density. However it will be realised that other criteria may be chosen, such as building density, road layout, etc, so as to increase a likelihood of the portions covering areas where identification of locations is useful. In the example embodiment, the portions are arranged based on population density. The population density may be determined based upon a density of house numbers, point addresses or in other suitable manners. In an illustrative example, the country 100 will be described as the Netherlands around which a rectangle is defined around the complete territory within which locations are to be identified using six character identifiers.

In step 320 cells are assigned to cover the first map portion selected in step 320. The cells may be distributed over a single unitary area, such as area 110 or divided amongst a plurality of areas, such as areas 121, 122, 123, 124.

The location and identification of the cells may be stored in a data storage structure, such as a database for later retrieval and use. The database may store one or more context tables which may be used by a computing device, such as a navigation device, to determine geographic locations based on received identifiers. Each context table may comprise a context identifier associated with a geographic region, such as a country or state. The context identifier may be a letter or number identifying the region, such as an ISO code for the country. Associated with the context identifier in the table is identification information relating to a first plurality of cells for the geographic region. The first plurality of cells are each identified by an identifier of a first length, such as six characters, although it will be realised that other lengths may be used depending, at least partly, on the area of the region. Also stored in the context table is identification information relating to a second plurality of cells, wherein each cell is associated with a unique identifier of a second length, shorter than the first length. For example the second length may be five characters. The second plurality of cells uniquely identifies locations within a sub-region of the geographic region identified by identifiers of the first length. That is, wherein geographic locations within the second plurality of cells are uniquely identified by identifiers of both the first and second lengths. As will be explained, the context table may be used by a navigation device to determine geographic locations from received identifiers, such that routes may be calculated between first and second locations identified by first and second identifiers, which may be of different lengths.

In step 330 the x character identifier is assigned to a context. A context is an identifier which associates the identifier with the first map portion, such that lower level (shorter) identifiers may also be associated with the first map portion, as will be explained. Where the first map portion is a country, the x character identifier is associated with a context which identifies the country. In some embodiments, the context is identified by an ISO country code which for the Netherlands is NL (2 digit) or NLD (3 digit). However the identifier may be associated with other types of code for a geographic region such as EP for Europe or TX for the US state of Texas, as examples. In still further embodiments the identifier may be any selected letter or number chosen to identify the context.

In step 340 y is incremented to indicate that one or more second portions (for the first iteration of step 340) of the map are to be selected and x is decremented to utilise a shorter identifier for the second portions. Whilst in the illustrative example x is decremented by 1, this is not essential and x may be decremented by more than 1.

In step 350 the one or more second portions (for the first iteration of step 150) of the map are selected. The maximum number and size of the second portions may be predetermined according to the length of the identifier. For example, given that a 5 character identifier may identify up to 2,862.9 km$^2$ for a cell size of 100 m$^2$ up to 28 second portions of the map may be selected each having a size of 100 km$^2$. Other sizes may be chosen and the maximum number of portions varied accordingly. Step 350 may comprise a sub-step of determining a population density of locations, based upon which the portions of the map are selected. The population density may be calculated based upon house numbers, point addresses, lists of cities and associated populations, etc.

Thus in an exemplary embodiment of step 350 up to 28 second portions of the map are selected each having a size of up to 100 km$^2$. Alternatively, this step may be considered as locating up to 28 regions with respect to the map data. For the Netherlands a 5 character identifier and cell size of 100 m$^2$ is expected to cover approximately one quarter of the population or around 4 million people.

Figure 4A:
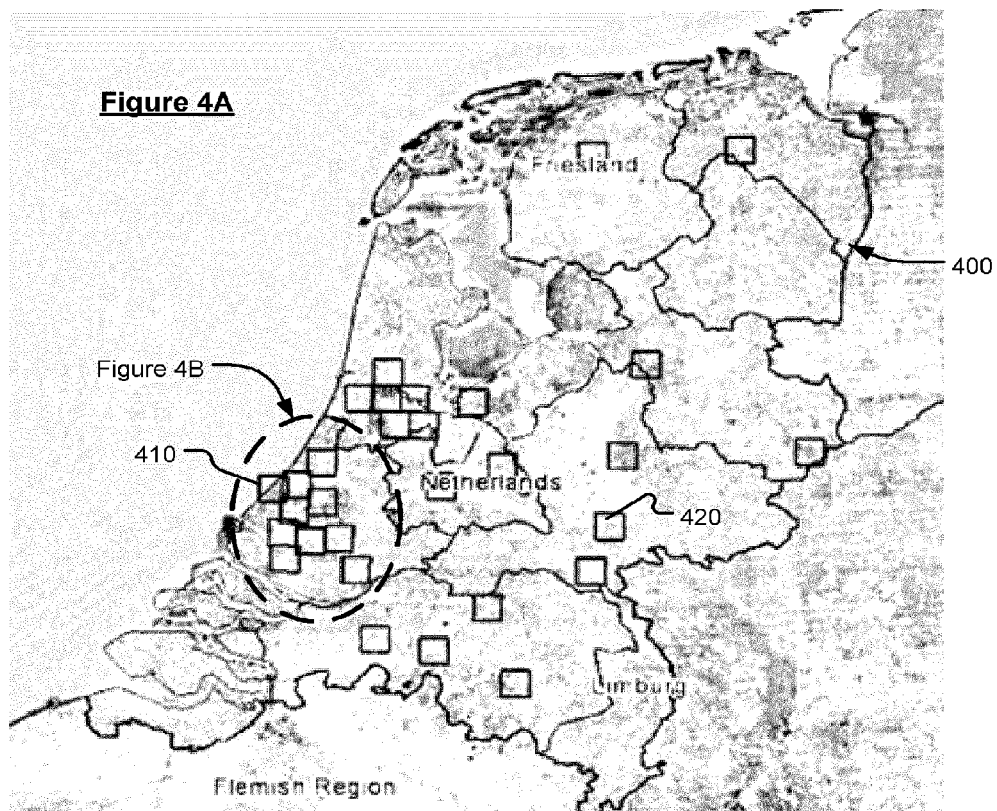
FIGS. 4A and 4B are illustrations of a country as a geographic region having a plurality of portions selected.
Figure 4B:
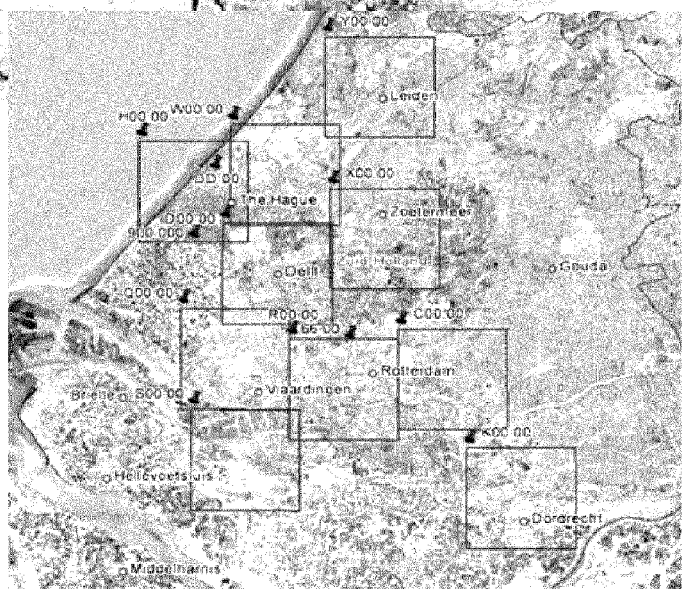

FIGS. 4A and 4B illustrate, as an example, The Netherlands as a country 400 having a plurality of second portions 410, 420 (only two of which are identified with reference numerals) selected based upon population density.

In step 360 cells are assigned according to the identifier of x characters in length, such as a five character AB.XYZ identifier, amongst the second portions of the map such that all of the second portions may be identified according to the cell size. The location and identifier associated with each call may be stored in the database.

In step 370 the cells are associated with a context. The context for the second portions may also be the country code or other identifier chosen for the context. However, the context for the second portions may additionally or alternatively be another feature of the map data such as a city name. For example if a second portion of the map covers Amsterdam then the context for that second portion may be the city name.

The regions may be associated by storage in a database associated with the context identifier.

In step 380 it is determined whether the method 300 has finished. Termination of the method may be performed when a minimum size identifier has been reach, such as x=4, i.e. a shortest identifier of four characters, although other predetermined values may be used.

If the method has not finished then it returns to step 340 where, in the second iteration y is incremented to select one or more third portions of the map to identify with the decremented identifier length of x=4.

In the next iteration of step 350 the one or more third portions of the map are selected according to predetermined criteria. Although the same criteria may be used as in the previous iteration of step 350 it is envisaged that, in some embodiments, one or more alternative criteria may be used. In the exemplary embodiment the third portions may be between one or five portions of the map of 18.4 km$^2$ thus having a total area of less than 92.4 km$^2$. It will be realised that other size areas may be utilised. The third portions are selected to cover the most populated regions of the map. For the Netherlands the five third portions are expected to cover around 1.5 million people or 10% of the population.

Figure 5:
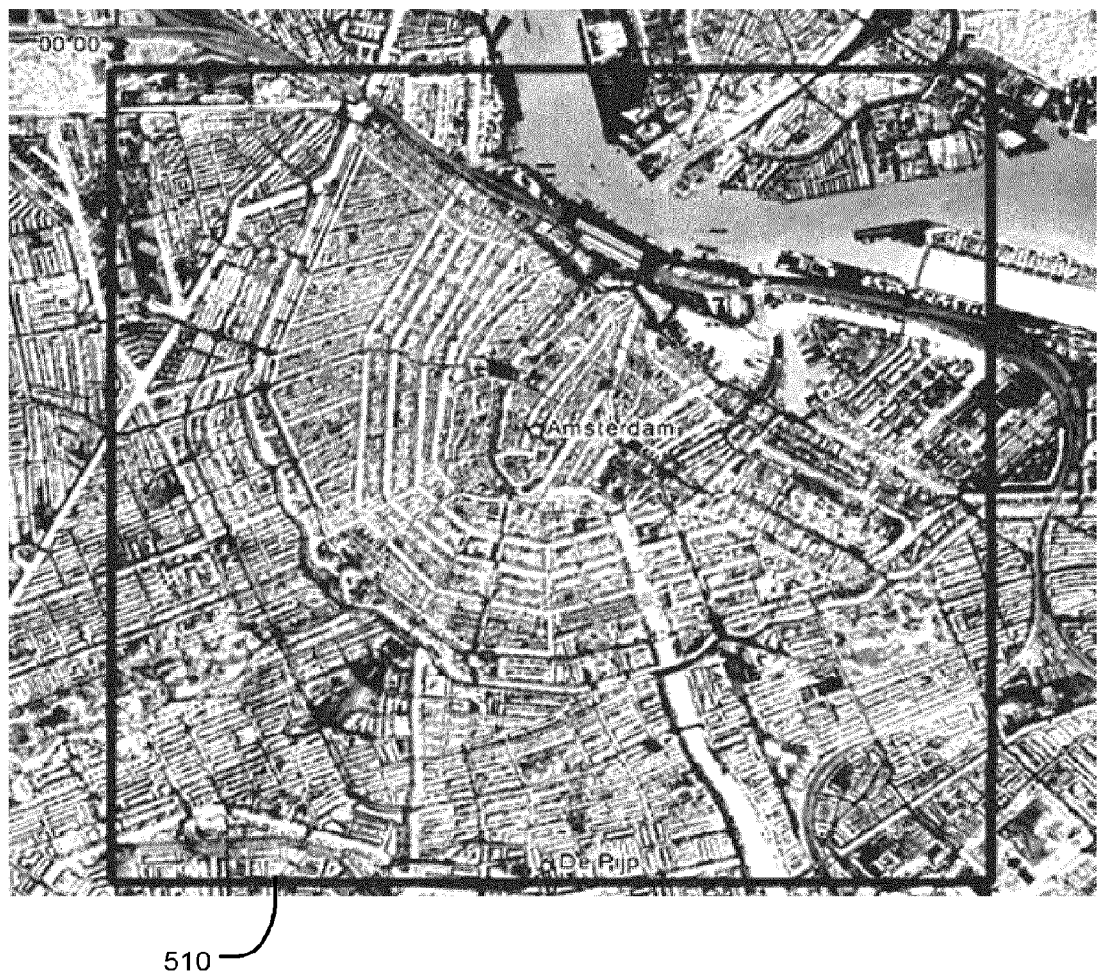
FIG. 5 is an illustration of a city selected as a portion of a geographic region.

FIG. 5 illustrates a third portion 510 of the exemplary map of the Netherlands selected in step 350. The portion 510 corresponds to the city of Amsterdam which is selected due to its relatively high population density.

In step 370 the third portions are assigned to a context, such as stored in the database associated with the ISO country code NL, respective city name or other context identifier.

Figure 6:
FIG. 6 is an illustration of the Earth showing geographic regions corresponding to countries identified.

The method 300 may be applied to determine identifiers for all countries in the world. Currently there are believed to be 196 countries and 53 overseas/autonomous entities. Firstly, an area is defined around each country in step 310. For countries larger than 2.7 million km$^2$ (corresponding to an eight figure identifier) such as the USA and India states or other sub-regions of the country may be used as the first portion of the map. FIG. 6 illustrates a portion of the earth in relation to first portions selected in step 310. In following repetitions of step 350 second and third portions of the map are selected which may correspond to the most populous areas within those countries or states.

Figure 7:
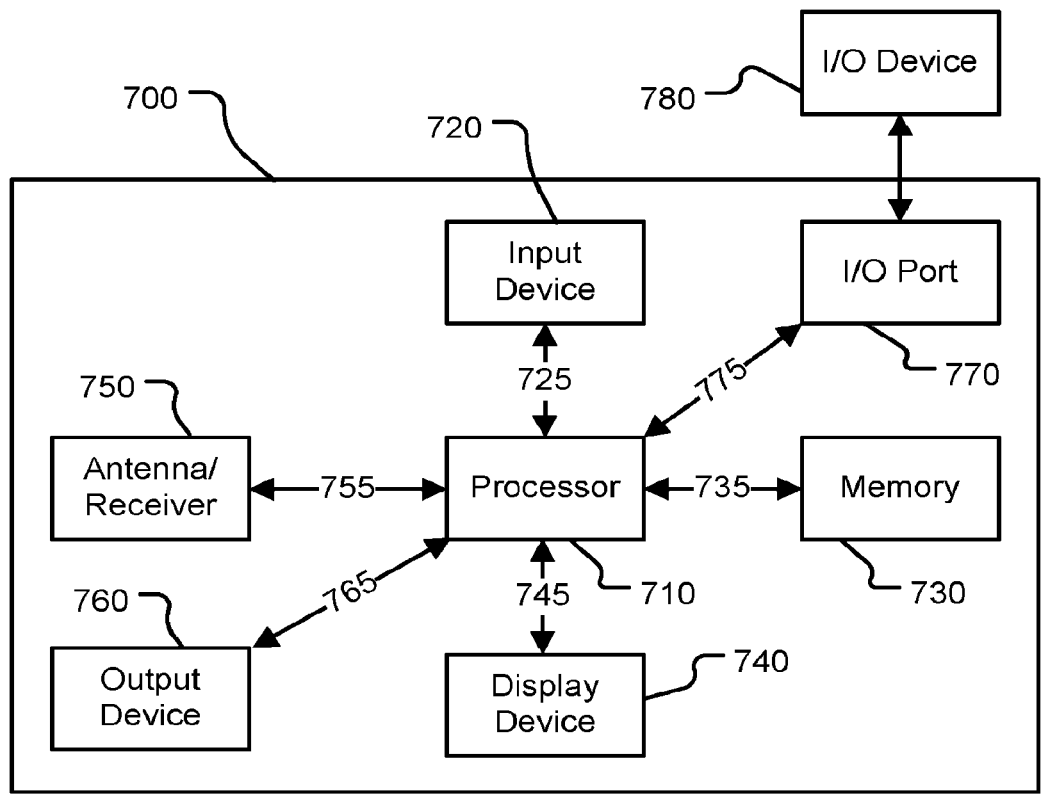
FIG. 7 shows a schematic of a navigation device according to an embodiment of the invention.

FIG. 7 is an illustrative representation of electronic components of a navigation device 700 according to a preferred embodiment of the present invention, in block component format. It should be noted that the block diagram of the navigation device 700 is not inclusive of all components of the navigation device, but is only representative of many example components.

The navigation device 700 is located within a housing (not shown). The housing includes a processor 710 connected to an input device 720 and a display screen 740. The input device 720 can include a keyboard device, voice input device, touch panel and/or any other known input device utilised to input information; and the display screen 740 can include any type of display screen such as an LCD display, for example. In a particularly preferred arrangement the input device 720 and display screen 740 are integrated into an integrated input and display device, including a touchpad or touchscreen input so that a user need only touch a portion of the display screen 740 to select one of a plurality of display choices or to activate one of a plurality of virtual buttons.

The navigation device may include an output device 760, for example an audible output device (e.g. a loudspeaker). As output device 760 can produce audible information for a user of the navigation device 700, it is should equally be understood that input device 740 can include a microphone and software for receiving input voice commands as well.

In the navigation device 700, processor 710 is operatively connected to and set to receive input information from input device 720 via a connection 725, and operatively connected to at least one of display screen 740 and output device 760, via output connections 745, to output information thereto. Further, the processor 710 is operably coupled to a memory resource 730 via connection 735 and is further adapted to receive/send information from/to input/output (I/O) ports 770 via connection 775, wherein the I/O port 770 is connectible to an I/O device 780 external to the navigation device 700. The memory resource 730 comprises, for example, a volatile memory, such as a Random Access Memory (RAM) and a non-volatile memory, for example a digital memory, such as a flash memory. The external I/O device 780 may include, but is not limited to an external listening device such as an earpiece for example. The connection to I/O device 780 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 700 and the internet or any other network for example, and/or to establish a connection to a server via the internet or some other network for example.

FIG. 7 further illustrates an operative connection between the processor 710 and an antenna/receiver 750 via connection 755, wherein the antenna/receiver 750 can be a GPS antenna/receiver for example. It will be understood that the antenna and receiver designated by reference numeral 750 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 7 are powered by power sources (not shown) in a conventional manner. As will be understood by one of ordinary skill in the art, different configurations of the components shown in FIG. 7 are considered to be within the scope of the present application. For example, the components shown in FIG. 7 may be in communication with one another via wired and/or wireless connections and the like. Thus, the scope of the navigation device 700 of the present application includes a portable or handheld navigation device 700.

In addition, the portable or handheld navigation device 700 of FIG. 7 can be connected or "docked" in a known manner to a vehicle such as a bicycle, a motorbike, a car or a boat for example. Such a navigation device 700 is then removable from the docked location for portable or handheld navigation use.

Figure 8:
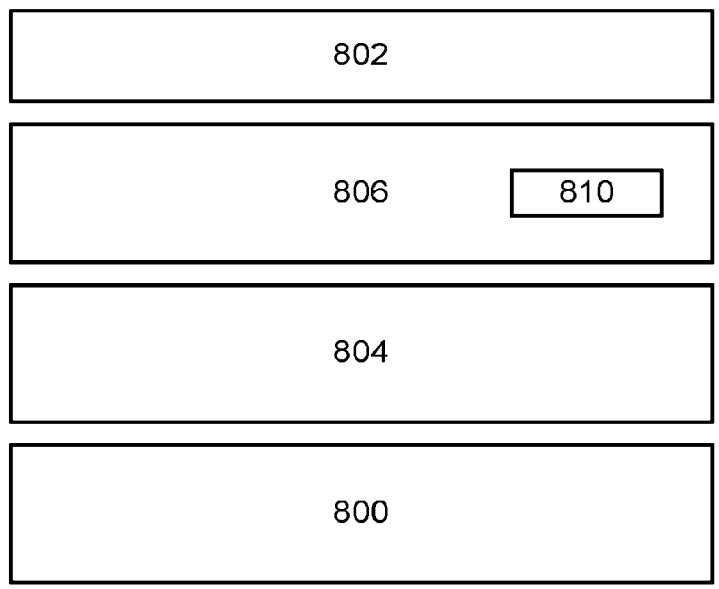
FIG. 8 an illustration of a software stack according to an embodiment of the invention.

FIG. 8 shows a software stack that may be used in a preferred embodiment of the mobile navigation device 700. The stack comprises an OS kernel 800. This may include display drivers, keypad drivers, camera drivers, power management, audio drivers, etc. The stack also comprises libraries 804, e.g. including graphics libraries, runtime libraries, etc. The stack also comprises an application framework 806, which includes a "mapcode" module 810 and may also include, for example, a window manager, resource manger notification manger, a telephony manager, etc. The stack also comprises one or more applications 802, i.e. to provide navigation functionality.

The mapcode module 810 provides one or more function associated with the identifiers discussed above. The mapcode module operates in conjunction with a store comprising one or more context tables as referred to above.

In one embodiment the mapcode module provides a "DecodeMapcode" function which given an identifier according to an embodiment of the invention determines the geographic location corresponding to the identifier. The DecodeMapcode function may return coordinates in a predetermined coordinate system of a centre of the respective cell, such as in WGS84 format. The mapcode module 810 may be arranged to determine the geographic location corresponding to the identifier and context information. The context information may be the ISO country code associated with the identifier, such as NL, or may be a city name such as Amsterdam. The context information allows the mapcode module to distinguish an identifier of a particular length relating to a first country from an identifier of the same length relating to a second country. The context information may be inferred by mapcode module 810 from the current location of the navigation device 700. For example, if the navigation device 700 determines that its current location is The Netherlands then the mapcode module may use NL as the default context information, unless a user enters specific context information.

Other functions which may be provided by embodiments of the mapcode module 810 are "GetPossibleMapcode" which returns a list or array of possible identifiers given a portion of an identifier entered by a user and the context information. The possible identifiers may be determined based on the portion of the identifier and the identifiers matching that portion in the database.

Similarly, a function "NrOfPossibleMapcodes" may return a value indicative of the number of identifiers corresponding to the portion of the identifier entered by the user.

The mapcode module 810 may in some embodiments also provide a function "EncodeMapcode" which given location information, such as WGS84 coordinates, and context information may return one or more identifiers according to an embodiment associated with that location information. It will be recalled that a plurality of identifiers may be associated with some locations.

The mapcode module 810 may determine identifiers corresponding to geographic locations, locations corresponding to identifiers and possible identifiers from the portion of an identifier provided by a user by accessing the data storage structure, such as the context table database, storing identifier and context information. The database may either be stored locally to the navigation device 700 such as in memory 430 or may be remotely accessed by the navigation device 700 such as via a server and data connection to the navigation device 700.

It will be appreciated that embodiments of the present invention provide a system for identifying geographic locations, wherein some locations may be identified by multiple unique identifiers of different lengths. Advantageously this allows a shorter identifier to be used to more conveniently identify a location. By allocating cells identified with shorter identifiers to locations which are more likely to be desired to be identified, the average length of identifier in use can be reduced. Furthermore, using embodiments of the invention there are reduced limitations on the number of locations that may be identified with shorter identifiers i.e. more than one location may be identified with an identifier of a chosen length.

Embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. Moreover, the claims should not be construed to cover merely the foregoing embodiments, but also any embodiments which fall within the scope of the claims.

The invention claimed is:

1. A computer-implemented method for assigning identifiers to geographic locations within digital map data, the method comprising:
   selecting a region within the map data;
   dividing the region into a first plurality of cells each uniquely addressable by an identifier of a first length;
   selecting a portion of the region; and
   dividing the portion into a second plurality of cells each uniquely addressable by an identifier of a second length, wherein the second length is shorter length than the first length and a geographic location within the portion of the region may be uniquely identified by an identifier of the first length and an identifier of the second length.

2. The method of claim 1, wherein the portion of the region is selected based on one or more attributes of the map data.

3. The method of claim 2, wherein one or both of the region and the portion of the region are selected based upon one or more criteria and the attributes of the map data.

4. The method of claim 3, wherein the criteria are indicative of a population density associated with the digital map data.

5. The method of claim 1, wherein the region corresponds to a region demarcated in the map data.

6. The method of claim 1, comprising selecting one or more further portions of the region, and dividing the one or more further portions into further pluralities of cells each uniquely addressable by an identifier of successively short length.

7. The method of claim 6, wherein a geographic location in each further portion of the region is identifiable by a plurality of identifiers or different lengths.

8. The method of claim 1, wherein the region and the one or more portions are divided into substantially equally sized cells.

9. The method of claim 1, wherein the identifier comprises prefix and postfix portions divided by a separator.

10. The method of claim 1, wherein the identifier is formed from alphanumeric characters.

11. A non-transitory computer readable medium comprising instructions that, when executed by one or more processors of a computing device, cause the computing device to perform the method of claim 1.

12. A navigation device, comprising:
a display screen for providing navigation information to a user; and
a processor communicably coupled to a data store comprising a context table, wherein the context table comprises:
 a context identifier associated with a geographic region;
 information identifying a location of a firstly plurality of cells dividing at least a part of the geographic region, each cell being associated with a unique identifier of a first length; and
 information identifying a location of a second plurality of cells dividing one portions of the geographic region, each cell being associated with a unique identifier of a second length,
 wherein geographic locations within the second plurality of cells are uniquely identified by identifiers of the first and second lengths, and
wherein the processor is arranged to receive, from a user, at least one identifier, and to determine at least one geographic location corresponding to the respective identifier from the context table.

13. The navigation device of claim 12, wherein the context table comprises one or more further pluralities of cells dividing portions of the geographic region, each cell in each respective plurality of cells being associated with a unique identifier of successively decreasing length.

14. The navigation device of claim 12, wherein the first and second pluralities of cells are associated with the context identifier.

15. The navigation device of claim 14, wherein the second plurality of cells is associated with one or more further context identifiers.

16. The navigation device of claim 12, wherein the context table comprises size information indicating a size of each cell in the first and second plurality of cells.

17. The navigation device of claim 12, wherein the at least one identifier received from the user is representative of a desired destination, and the processor is arranged to determine a route to the geographic location identified by the received identifier.

18. The navigation device of claim 12, wherein the processor is arranged to receive a context identifier from the user, wherein the context identifier is indicative of a geographic region, and wherein the processor is arranged to determine the at least one geographic location using the context table based on the received context identifier.

19. A computer-implemented method, comprising:
receiving, from a user, at least one identifier;
accessing a data store comprising a context table, wherein the context table comprises:
 a context identifier associated with a geographic region;
 information identifying a location of a firstly plurality of cells dividing at least a part of the geographic region, each cell being associated with a unique identifier of a first length; and
 information identifying a location of a second plurality of cells dividing one portions of the geographic region, each cell being associated with a unique identifier of a second length,
 wherein geographic locations within the second plurality of cells are uniquely identified by identifiers of the first and second lengths; and
determining at least one geographic location corresponding to the respective identifier from the context table.

20. A non-transitory computer readable medium comprising instructions that, when executed by one or more processors of a computing device, cause the computing device to perform the method of claim 19.

* * * * *